United States Patent
Lv et al.

(10) Patent No.: US 11,570,846 B2
(45) Date of Patent: Jan. 31, 2023

(54) DISCARD TIMER OPERATION IN WIRELESS COMMUNICATION

(71) Applicant: ZTE Corporation, Guangdong (CN)

(72) Inventors: Kaiying Lv, Guangdong (CN); Li Zhang, Guangdong (CN); Yajun Zhao, Guangdong (CN); Li Niu, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/068,735

(22) Filed: Oct. 12, 2020

(65) Prior Publication Data

US 2021/0029777 A1 Jan. 28, 2021

Related U.S. Application Data

(63) Continuation of application No. PCT/CN2018/082673, filed on Apr. 11, 2018.

(51) Int. Cl.
*H04W 80/08* (2009.01)
*H04W 76/38* (2018.01)
(Continued)

(52) U.S. Cl.
CPC ........... *H04W 80/08* (2013.01); *H04W 16/14* (2013.01); *H04W 28/065* (2013.01); *H04W 76/38* (2018.02); *H04W 80/02* (2013.01)

(58) Field of Classification Search
CPC ..... H04W 80/08; H04W 76/38; H04W 16/14; H04W 28/065; H04W 80/02
See application file for complete search history.

(56) References Cited

U.S. PATENT DOCUMENTS 8,270,369 B1 * 9/2012 Chang ................... H04W 36/02
370/332
2015/0023370 A1 * 1/2015 Sammour ............. H04L 1/1874
370/465
(Continued)

FOREIGN PATENT DOCUMENTS

CN 106576318 A 4/2017
EP 2830352 A1 1/2015
(Continued)

OTHER PUBLICATIONS

European Extended Search Report dated Jan. 29, 2021, for EP Application No. 18914585.7, 9 pages.
(Continued)

*Primary Examiner* — San Htun
(74) *Attorney, Agent, or Firm* — Perkins Coie LLP

(57) ABSTRACT

A wireless communication method is described for managing packet data convergence protocol (PDCP) service data unit (SDU). The method can include receiving, at a first protocol layer of a first communication device, a first service data unit (SDU) and a second service data unit (SDU) for a source from a second protocol layer for transmission to a second communication device. The method can also include starting a first timer with a first initial value for the first SDU, and starting a second timer with a second initial value for the second SDU. The second initial value can be different from the first initial value in response to determining that the second SDU is to be routed differently from the first SDU to the second communication device.

18 Claims, 8 Drawing Sheets

(51) Int. Cl.
    *H04W 16/14*    (2009.01)
    *H04W 28/06*    (2009.01)
    *H04W 80/02*    (2009.01)

(56) References Cited

U.S. PATENT DOCUMENTS

| | | | |
|---|---|---|---|
| 2015/0043435 A1* | 2/2015 | Blankenship | H04W 72/042 |
| | | | 370/329 |
| 2016/0088127 A1* | 3/2016 | Cai | H04W 36/023 |
| | | | 370/328 |
| 2016/0164793 A1* | 6/2016 | Basu Mallick | H04L 47/32 |
| | | | 370/235 |
| 2017/0041767 A1* | 2/2017 | Vajapeyam | H04L 47/34 |
| 2017/0310531 A1 | 10/2017 | Dinan | |
| 2018/0302816 A1* | 10/2018 | Yi | H04W 28/0205 |

FOREIGN PATENT DOCUMENTS

| | | |
|---|---|---|
| EP | 3270622 A1 | 1/2018 |
| WO | 2014113686 A2 | 7/2014 |
| WO | 2014113686 A3 | 7/2014 |
| WO | 2017171912 A1 | 10/2017 |

OTHER PUBLICATIONS

3GPP TSG-RAN WG2 Meeting #101 bis Sanya, China, Apr. 16-20, 2018, R2-1805348 (revision of R2-1803234), 5 pages.
International Search Report and Written Opinion dated Jan. 4, 2019 for International Application No. PCT, filed on Apr. 11, 2018 (8 pages).

* cited by examiner

DISCARD TIMER OPERATION IN WIRELESS COMMUNICATION

CROSS REFERENCE TO RELATED APPLICATIONS

This patent document is a continuation of and claims benefit of priority to International Patent Application No. PCT/CN2018/082673, filed on Apr. 11, 2018. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for operating and managing timers for controlling delivery of service data unit (SDU) or packet data unit (PDU). A first exemplary embodiment discloses a wireless communication method that comprises receiving, at a first protocol layer of a first communication device, a first service data unit (SDU) and a second service data unit (SDU) for a source from a second protocol layer for transmission to a second communication device, starting a first timer with a first initial value for the first SDU, and starting a second timer with a second initial value for the second SDU, wherein, the second initial value is different from the first initial value in response to determining that the second SDU is to be routed differently from the first SDU to the second communication device.

In some embodiments related to the first embodiment, the source is a session at the first protocol layer or a radio bearer. In some embodiments related to the first embodiment, the first SDU is routed to the second communication device via an unlicensed spectrum channel and the second SDU is routed to the second communication device via a licensed spectrum channel. In such embodiments, the first initial value is greater than the second initial value.

In some other embodiments related to the first embodiment, the second SDU is routed to the second communication device via an unlicensed spectrum channel and the first SDU is routed to the second communication device via a licensed spectrum channel. In such embodiments, the second initial value is greater than the first initial value.

In some embodiments related to the first embodiment, the first protocol layer is a protocol data convergence layer and the second protocol layer is an upper layer of the first protocol layer. In some embodiments related to the first embodiment, the first communication device is a user equipment and the second communication device is a base station. In some other embodiments related to the first embodiment, the first communication device is a base station and the second communication device is a user equipment.

A second exemplary embodiment discloses a wireless communication method that comprises receiving, at a first protocol layer of a first communication device, a service data unit (SDU) from a second protocol layer, and starting, multiple timers in response to receiving the SDU, wherein each of the multiple timers corresponds to a different path for routing a plurality of packet data units (PDU) generated from the SDU to a second communication device. In some embodiments related to the second embodiment, the plurality of PDUs generated from the SDU include duplicate PDUs and wherein the timers for the duplicate PDU are started at different times.

In some embodiments related to the second embodiment, a first PDU is routed to the second communication device via an unlicensed spectrum channel and a second PDU is routed to the second communication device via a licensed spectrum channel, and the second PDU is a duplicate of the first PDU. In such embodiments, a first initial value for a first timer of the first PDU is greater than a second initial value for the second timer of the second PDU.

In some other embodiments related to the second embodiment, a first PDU is routed to the second communication device via a licensed spectrum channel and a second PDU is routed to the second communication device via an unlicensed spectrum channel, and the second PDU is a duplicate of the first PDU. In such embodiments, a second initial value for a second timer of the second PDU is greater than a first initial value for the first timer of the first PDU.

In some embodiments related to the second embodiment, the method further includes generating multiple PDUs from the SDU, and discarding a given PDU that remains untransmitted at expiration of corresponding timer while retaining the SDU for transmission.

In some embodiments related to the second embodiment, the method further includes generating multiple PDUs from the SDU, receiving an indication of a successful delivery of the SDU, and discarding, after receiving the indication, the SDU.

In some embodiments related to the second embodiment, the method includes performing any one of: discarding, after receiving the indication, the multiple PDUs generated from the SDU, and indicating to entities of a third protocol layer that the SDU has been discarded. In some embodiments related to the second embodiment, the method further includes discarding the SDU in response to expirations of the multiple timers. In some embodiments related to the second embodiment, the first protocol layer is a protocol data convergence layer, the second protocol layer is an upper layer of the first protocol layer, and the entities of the third protocol layer are radio link control (RLC) entities.

In some embodiments related to the second embodiment, the first communication device is a user equipment and the second communication device is a base station. In some other embodiments related to the second embodiment, the first communication device is a base station and the second communication device is a user equipment.

A third exemplary embodiment discloses a wireless communication method that comprises receiving, at a first protocol layer of a first communication device, a service data unit (SDU) for a source from a second protocol layer, and setting initial values for multiple timers in response to receiving the SDU, wherein each of the multiple timers corresponds to a different path for routing a plurality of packet data units (PDU) generated from the SDU to a second communication device. In some embodiments related to the third embodiment, the plurality of PDUs generated from the SDU include duplicate PDUs and wherein the timers for the duplicate PDU are started at different times.

In some embodiments related to the third embodiment, the method further includes starting, in response to receiving a feedback from a secondary cell group (SCG), a first timer for a first PDU routed to the second communication device via an unlicensed spectrum channel, and starting, in response to receiving a failure report feedback from the SCG, a second timer for a second PDU routed to the second communication device via a licensed spectrum channel, wherein the second PDU is a duplicate of the first PDU. In some embodiments related to the third embodiment, a first initial value for the first timer is greater than a second initial value for the second timer. In some embodiments related to the third embodiment, the first protocol layer is a protocol data convergence layer and the second protocol layer is an upper layer of the first protocol layer.

In some embodiments related to the third embodiment, the first communication device is a user equipment and the second communication device is a base station. In some other embodiments related to the third embodiment, the first communication device is a base station and the second communication device is a user equipment.

A fourth exemplary embodiment discloses a wireless communication method that comprises receiving, at a first protocol layer of a communication device, a service data unit (SDU) from a second protocol layer of the communication device, starting, after the receiving, a first timer, generating a first packet data unit (PDU) from the SDU, and routing, by the first protocol layer, the first PDU to a first entity of a third protocol layer of the communication device.

In some embodiments related to the fourth embodiment, the method further includes routing, by the first protocol layer, a second PDU to a second entity of the third protocol layer in response to at least one of a first buffer status of the first protocol layer, a status of a buffer associated with the first entity or the second entity of the third protocol layer, one or more buffer status of a fourth protocol layer, a channel occupancy rate, a received signal strength indication (RSSI), a listen before talk (LBT) status, a channel access delay, and an expiration of a timer associated with the PDU of the third protocol layer.

In some embodiments related to the fourth embodiment, the method further includes starting a second timer in response to routing the second PDU to the second entity of the third protocol layer. In such embodiments, a first initial value of the first timer and a second initial value of the second timer are different.

In some embodiments related to the fourth embodiment, the first protocol layer and the first entity of the third protocol layer are associated with a master cell group (MCG) that utilize a licensed spectrum channel for transmission, and the second entity of the third protocol layer is associated with a secondary cell group (SCG) that utilize an unlicensed spectrum channel or a licensed spectrum channel for transmission. In such embodiments, the routing of the second PDU to the second entity of the third protocol layer is in response to at least one of: the first buffer status of the first protocol layer indicating buffered data being over threshold, the status of the buffer associated with the first entity of the third protocol layer indicating buffered data being over threshold, the status of the buffer associated with the second entity of the third protocol layer indicating buffered data being below threshold, a second buffer status of the fourth protocol layer associated with the MCG indicating buffered data being over threshold, a third buffer status of the fourth protocol layer associated with the SCG indicating buffered data being below threshold, the channel occupancy rate measured in SCG being below threshold, the RSSI measured in SCG being below threshold, the LBT status indicating a failure rate measured in SCG being below threshold, and an average of the channel access delay measured in SCG is below threshold.

In some embodiments related to the fourth embodiment, the first protocol layer and the first entity of the third protocol layer are associated with a secondary cell group (SCG) that utilize an unlicensed spectrum channel or a licensed spectrum channel for transmission, and the second entity of the third protocol layer is associated with a master cell group (MCG) that utilize a licensed spectrum channel for transmission. In such embodiments, the routing of the second PDU to the second entity of the third protocol layer is in response to at least one of: the first buffer status of the first protocol layer indicating buffered data being over threshold, the status of the buffer associated with the first entity of the third protocol layer indicating buffered data being over threshold, the status of the buffer associated with the second entity of the third protocol layer indicating buffered data being below threshold, a second buffer status of the fourth protocol layer associated with the SCG indicating buffered data being over threshold, a third buffer status of the fourth protocol layer associated with the MCG indicating buffered data being below threshold, the channel occupancy rate measured in SCG being over threshold, the RSSI measured in SCG being over threshold, the LBT status indicating a failure rate measured in SCG being over threshold, and an average of the channel access delay measured in SCG is over threshold.

In some embodiments related to the fourth embodiment, the method further includes discarding, by the first entity of the third protocol layer, the first PDU received from the first protocol layer in response to (1) the expiration of the timer associated with the PDU of the third protocol layer and (2) a determination that the first entity of the third protocol layer has not sent a first SDU related to the first PDU or any segment of the first SDU to a lower layer, indicating, by the first entity of the third protocol layer, the discarding of the first PDU to the first protocol layer, and routing, by the first protocol layer, the first PDU to the second entity of the third protocol layer. In some embodiments related to the fourth embodiment, the method further includes setting, after the discarding, a first initial value of the first timer.

In some embodiments related to the fourth embodiment, the method further includes indicating, by the first entity of the third protocol layer, the expiration of the timer associated with the PDU of the third protocol layer, routing, by the first protocol layer, the first PDU to the second entity of the third protocol layer, and starting, after the routing of the first PDU to the second entity of the third protocol layer, a second timer.

In some embodiments related to the fourth embodiment, the first protocol layer is a protocol data convergence layer, the second protocol layer is an upper layer of the first protocol layer, the first entity of the third protocol layer is a first radio link control (RLC) entity, the second entity of the third protocol layer is a second RLC entity, and the fourth protocol layer is a medium access control (MAC) entity.

In some embodiments related to the fourth embodiment, the communication device is a user equipment or a base station.

A fifth exemplary embodiment discloses a wireless communication method that comprises receiving, by a first protocol layer, control messages sent by a second protocol layer using a plurality of signaling radio bearers (SRBs), wherein the control messages are generated by the second protocol layer, receiving a first packet data unit (PDU) corresponding to a first SRB and a second PDU corresponding to a second SRB, wherein the second PDU is a duplicate of the first PDU, starting, after the receiving, a first timer for the first PDU and a second timer for the second PDU, and assigning a first sequence number to the first PDU and a second sequence number to the second PDU.

In some embodiments related to the fifth embodiment, the first protocol layer is a packet data convergence protocol (PDCP) layer, and the second protocol layer is a radio resource control (RRC) layer.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
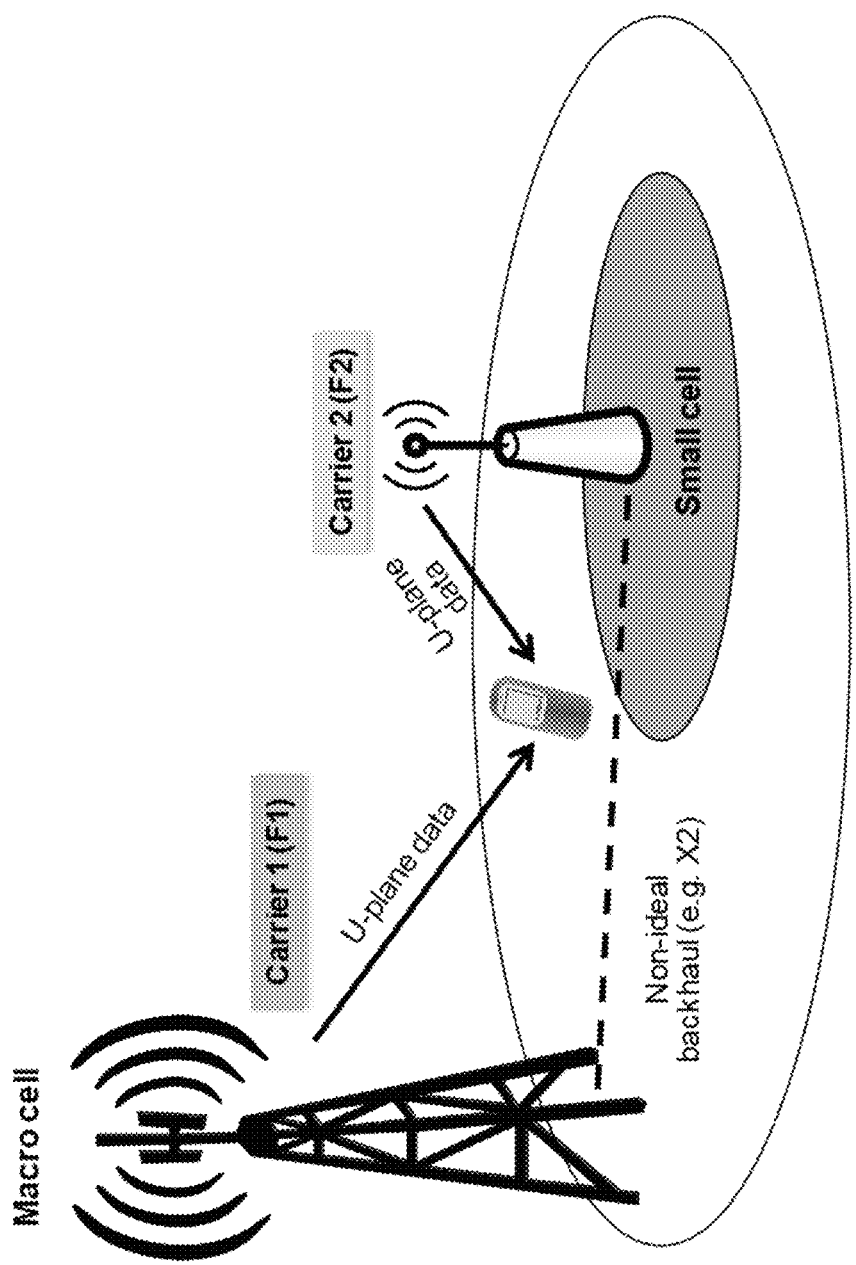
FIG. 1 shows an example of a dual connectivity deployment.

This patent document relates to wireless communications and, more particularly, to providing a timer-based mechanism for packet transmission or discarding, when packets are transmitted or received between communication device in a wireless communications network. In some described embodiments, the disclosed techniques are used by embodiments that include transmission and discard features of a Packet Data Convergence Protocol (PDCP) Service Data Unit (SDU).

A PDCP layer is located in the Radio Protocol Stack in the UMTS, or LTE, or 5G Air interface on top of the Radio Link Control (RLC) layer. PDCP provides its services to the Radio Resource Control (RRC) and user plane upper layers, such as an interne protocol (IP) layer. To provide a certain quality of services (QoS) to the upper layer traffic flow, the PDCP layer supports timer based Service Data Unit (SDU) discard. Data received by the PDCP from an upper layer is called PDCP SDU. The PDCP SDU may include packet data, such as information included in an IP packet. When the PDCP adds a header to the PDCP SDU, the PDCP SDU with the header information is referred to as PDCP Packet Data Unit (PDU). At the reception of a PDCP SDU from the upper layers, the transmitting PDCP entity starts a discard timer associated with the received PDCP SDU if a timer functionality is configured. The techniques described in this patent document allow a PDCP discard timer to be set to a value that can meet a QoS requirement of a specific traffic flow. Thus, the techniques described in this patent document can be used to avoid an excessive delay of transmission and long queue of PDCP SDUs buffered in a transmitter side. While specific embodiments are described by using PDCP and RLC layers as examples, the disclosed techniques are applicable to a generalized mechanism by which a transmit-side or a receive-side protocol stack implementation in a wireless device performs packet processing as packets are processed while receiving from a lower layer and sending to an upper layer, or vice versa.

Depending on network configuration and capabilities, a communication device, such as a base station, may use radio resources in either unlicensed or licensed wireless band or both to communicate with a user equipment. When using unlicensed band, Listen Before Talk (LBT) is one technique used in radio communications where radio transmitters first sense the radio environment before the transmitters start a transmission. Therefore, in at least some cases, transmission delay for a PDCP SDU through unlicensed band can be longer due to LBT failures, which may cause the PDCP SDU to be discarded when the discard timer expires. However, discarding a PDCP SDU already associated with a PDCP Sequence Number causes a sequence number gap in the transmitted PDCP Data PDUs, which can increase the PDCP reordering delay in the receiving PDCP entity.

One of the features of LTE-Advanced is Carrier Aggregation (CA), which can allow mobile network operators to combine a number of separate carriers. CA enables the operators to increase the peak user data rates and overall capacity of their networks and to exploit fragmented spectrum allocations in both licensed and unlicensed frequency band.

FIG. 1 shows an example of heterogeneous networks (HetNets) that include a macro cell and a small cell that are used to communicate with a user equipment. HetNets are being developed to meet the future requirements for carrying the ever-increasing broadband mobile traffic. With different carrier frequencies deployed at macro and small cell layers, dual connectivity (DC) can extend the LTE-Advanced Carrier Aggregation functionality to allow user equipment (UE) to simultaneously receive and transmit to at least two different network access points. The two different network access points or network nodes are usually called a master eNodeB (MeNB) and secondary eNodeB (SeNB). As an example, the macro cell shown in FIG. 1 can be a MeNB, and the small cell shown in FIG. 1 can be a SeNB. The one or more cells associated with or serving the MeNBs are called a master cell group (MCG), and the one or more cells associated with or serving the SeNBs are called a secondary cell group (SCG).

Figure 2:
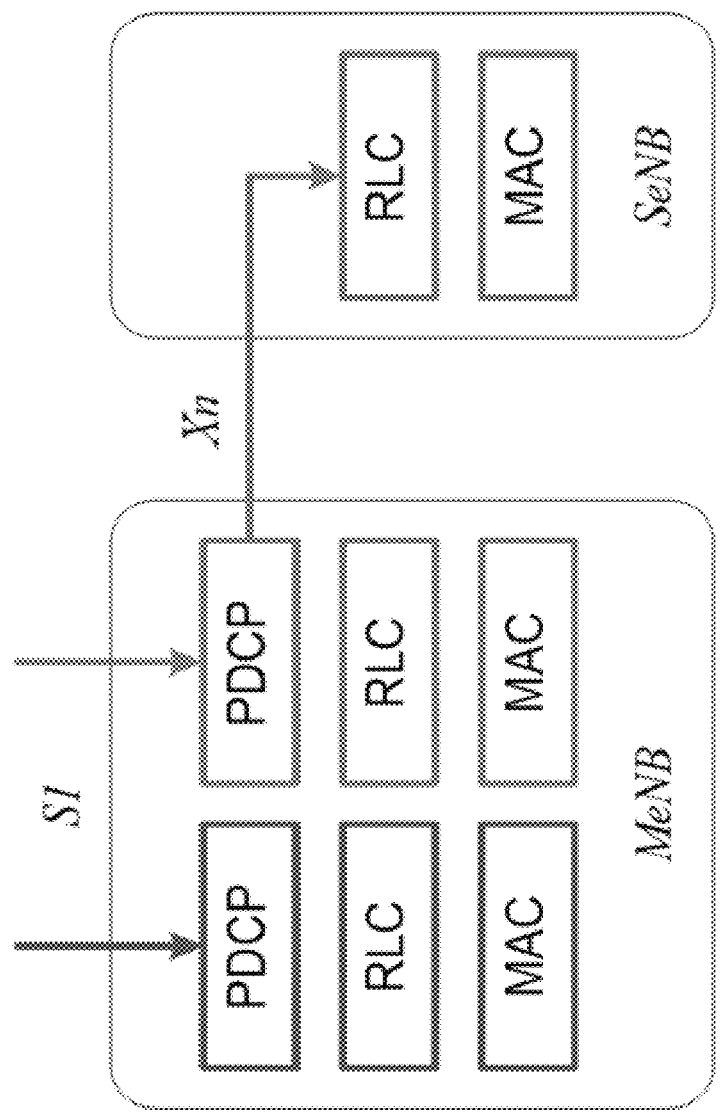
FIG. 2 illustrates a block diagram of user plane architecture for split bearer.

FIG. 2 illustrates a block diagram of user plane architecture for split bearer. In a DC deployment, from a UE perspective, three bearer types may exist: a master cell group (MCG) bearer, secondary cell group (SCG) bearer, and a split bearer. For split bearers, both MCG and SCG radio resources may be involved. In the case of split bearers, as shown in FIG. 2, user data that is received by a PDCP entity in a MeNB is split by the PDCP and sent to both the RLC entity of the MCG and the RLC entity of the SCG. Thus, in the case of split bearers, some PDCP packet data units (PDUs) may be transmitted through the MCG and some may be transmitted through the SCG. If a PDCP layer is configured and activated to perform duplication, the PDCP layer may duplicate the PDCP PDUs and transmit the original and duplicated PDCP PDUs to the MCG and SCG. As shown in FIG. 2, PDCP duplicated or split data can be transferred between the MeNB and the SeNB via the Xn interface.

Each Radio Bearer (RB) except for Signaling RB0 (SRB0) is associated with one PDCP entity. Each PDCP entity is associated with one, two, or four RLC entities depending on the RLC mode or the RB characteristic, for example, uni-directional, or bi-directional or split or non-split. For non-split bearers, each PDCP entity is associated with one Unacknowledged Mode (UM) RLC entity, two UM RLC entities (one for each direction), or one Acknowledged Mode (AM) RLC entity. For split bearers, each PDCP entity is associated with two UM RLC entities (for same direction), four UM RLC entities (two for each direction), or two AM RLC entities (for same direction).

For split bearers, routing or duplication can be performed in the transmitting PDCP entity. When routing is performed, one PDCP PDU is sent to one of RLC entities associated with the PDCP entity. When duplication is performed, one PDCP PDU is sent to one of RLC entity and the duplicate be sent to the same or different RLC entity associated with the PDCP entity.

Currently, one discard timer is associated with one PDCP SDU. When the discard timer expires for the PDCP SDU, or the successful delivery of the PDCP SDU is confirmed by PDCP status report, the transmitting PDCP entity discards the PDCP SDU along with the corresponding PDCP Data PDU.

To overcome at least some of the issues mentioned above, in an exemplary embodiment, a PDCP entity can set up multiple discard timers for one PDCP SDU or the PDCP entity can set multiple initial values to discard timers corresponding to PDCP SDUs received from the same PDCP session or same RB. In some embodiments, when PDCP PDUs of same PDCP session or same RB are routed to different cell groups or different carriers, the PDCP entity can set one initial value to a first discard timer associated with a first PDCP SDU being routed to one carrier or one cell group, and set another initial value to a second discard timer associated a second PDCP SDU being routed to another carrier or cell group. In some embodiments, as further explained in this patent document, the second PDCP SDU may be a duplicate of the first PDCP SDU.

In some embodiments, when a PDCP PDU is duplicated and each copy is routed to different cell groups or different carriers, the PDCP entity can starts multiple discard timers for the PDCP SDU, where the discard timers may be set to different initial values. In some embodiments, the multiple discard timers may be started at different times.

As described above, dual connectivity is a feature that allows a wireless device, such as a user equipment (UE) to simultaneously receive from and transmit to at least two different network points, commonly referred to as MeNB and SeNB or master node (MN) and secondary node (SN). A MN can serve a master cell group (MCG), and a SN can serve a secondary cell group (SCG).

In some embodiments, the network can configure the MCG using radio resources in licensed band and the SCG using radio resources in unlicensed band. The MN configures split bearers for a certain UE so that the transport of its user plane data involves both radio resources in licensed and unlicensed band. MN may receive one or more PDCP SDUs from upper layer to send to the UE, and then MN may transmit one or more PDCP PDUs to the UE through split bearers using radio resources in licensed and unlicensed band respectively. Some of the PDCP PDUs are transferred between the SN and the MN via the MN-SN user plane interface so that SN can transmit them to UE through SCG radio resources. For split bearers, each PDCP entity carrying the data of one DRB (Data Radio Bearer) is associated with two RLC entities for same direction (e.g., downlink or uplink). One RLC entity is located in MN, and the other RLC entity is located in SN. As further described in this patent document, the transmitting PDCP entity can start one or more discard timers associated with each PDCP SDU received from upper layers based on routing or duplication scheme.

The example headings for the various sections below are used to facilitate the understanding of the disclosed subject matter and do not limit the scope of the claimed subject matter in any way. Accordingly, one or more features of one example section can be combined with one or more features of another example section.

Embodiment 1

In some embodiments, if routing is applied for split bearers, each PDCP SDU received from upper layers for one PDCP session or for one RB may be routed to either a MCG, such a carrier in licensed wireless band, or to a SCG, such as a carrier in an unlicensed wireless band. At reception of a PDCP SDU, the transmitting PDCP entity can starts a discard timer associated with the received PDCP SDU. The initial value set to the discard timer can be based on the routing scheme. For example, if the PDCP PDU corresponding to the PDCP SDU is routed to carrier in licensed band, then the initial value can be set to value 1. As another example, if the PDCP PDU corresponding to the PDCP SDU is routed to carrier in unlicensed band, then the initial value can be set to value 2 or can be offset to value 1. Since the PDCP SDUs from the same PDCP session or same RB might be routed to different carriers, the initial values of discard timers for the PDCP SDUs may be different or varied.

Embodiment 2

In some embodiments, if PDCP duplication is applied for split bearers, each PDCP SDU received from upper layers for one PDCP session or for one RB may be duplicated and transported to both a MCG, such as a carrier in licensed band and a SCG, such as a carrier in unlicensed band. At reception of a PDCP SDU, the transmitting PDCP entity starts two discard timers associated with the received PDCP SDU. One of the two discard timers (referred to as "discard timer_1") can correspond to a PDCP SDU for MCG and the other discard timer (referred to as "discard timer_2") can correspond to the PDCP SDU for SCG. The PDCP SDU for the SGC can be a duplicate of the PDCP SDU for the MCG. The initial value of the discard timer_1 corresponding to MSG can be set to value 1, and the initial value of the discard timer_2 corresponding to SCG can be set to value 2 or an offset to value 1. In some embodiments, since one PDCP PDU associated with the PDCP SDU is duplicated and routed to different carriers, the initial values of discard timers for this PDCP SDU may be different or varied. In some embodiments, the multiple discard timers, such as discard timer_1 and discard timer_2, may be started at different times. The PDCP entity can send the original PDCP PDU to RLC entity1 that may be associated with a MCG and can send the duplicate PDCP PDU to RLC entity 2 that may be associated with a SCG.

The transmitting PDCP entity may not discard the PDCP SDU until both of discard timers expire. When one of the two discard timers expires for the same PDCP SDU, the transmitting PDCP entity may only discard the corresponding PDCP Data PDU associated with the expired discard timer. In this embodiment, as an example, if the discard timer_1 expires and the PDCP Data PDU has already been submitted to RLC entity1 of an MN of a MCG, then the discard can be indicated to RLC entity1. When indicated from the PDCP entity to discard a particular RLC SDU, the transmitting RLC entity can discard the indicated RLC SDU if neither the RLC SDU nor one or more segments of the RLC SDU has been submitted to the lower layers. However, for the duplicated PDCP Data PDU submitted to RLC entity2 in SCG, the discard of the PDCP Data PDU associated with discard timer_1 may not be indicated to RLC entity2 in SCG.

When the successful delivery of a PDCP SDU is confirmed by PDCP status report or the lower layers, such as RCL entity1 or RLC entity2, the transmitting PDCP entity can discard the PDCP SDU along with the corresponding PDCP Data PDU and the duplicated PDCP SDU. If the corresponding PDCP Data PDU has already been submitted to both RLC entity 1 in MCG and RLC entity 2 in SCG, the discard is indicated to both RLC entity1 and RLC entity2 if neither the RLC SDU nor one or more segments of the RLC SDU has been submitted to the lower layers.

Embodiment 3

In some embodiments, if carrier aggregation (CA) is applied for MCG, different PDCP SDUs received from upper layers for one PDCP session or for one RB may be scheduled to different carriers, such as carriers either operating in a licensed band or in a unlicensed band. At reception of a PDCP SDU, the transmitting PDCP entity can start a discard timer associated with and corresponding to each of the received PDCP SDU. The initial value set to the discard timer can be based on the routing scheme. For example, if the PDCP PDU corresponding to the PDCP SDU is routed to carrier in licensed band, then the initial value can be set to value 1. As another example, if the PDCP PDU corresponding to the PDCP SDU is routed to carrier in unlicensed band, then the initial value can be set to value 2 or an offset to value 1. Since the PDCP SDUs from the same PDCP session or same RB might be routed to different carriers within MCG, such as carrier in licensed band or carrier in unlicensed band, the initial values of discard timers for the PDCP SDUs may be different or varied.

Embodiment 4

In some embodiments, if CA is applied for MCG, each PDCP SDU received from upper layers for one PDCP session or for one RB may be duplicated and each copy can be scheduled to different carriers, such as carriers in a licensed band or carriers in an unlicensed band. At reception of a PDCP SDU, the transmitting PDCP entity can start two discard timers associated with the received PDCP SDU. One of the two discard timers (referred to as "discard timer_1") can correspond to a PDCP SDU for a carrier operating in a licensed band and the other discard timer (referred to as "discard timer_2") can correspond to the duplicated PDCP SDU for another carrier operating in an unlicensed band. The initial value of the discard timer_1 can be set to value 1, and the initial value of the discard timer_2 can be set to value 2 or an offset to value 1. Since one PDCP SDU may be duplicated and routed to different carriers, the initial values of discard timers for the one duplicated and routed PDCP SDU might be different or varied. In some embodiments, the multiple discard timers, such as discard timer_1 and discard timer_2, may be started at different times. When the discard timer_1 expires for a PDCP SDU, if the corresponding PDCP Data PDU has already been submitted to lower layers, for example, RLC entity1 in a MGC in licensed band, the discard can be indicated to lower layers, such as the RLC entity1. However, for the duplicated PDCP Data PDU submitted to lower layers, for example, RLC entity2 in a MGC in an unlicensed band, then the discard due to expiration of discard timer_1 may not be indicated to lower layers, such as RLC entity2.

Embodiment 5

In some embodiments, if PDCP duplication is applied for split bearers, each PDCP PDU received from upper layers for one PDCP session or for one RB may be duplicated and can be transported to a SCG, such as a carrier in unlicensed band, and optionally to a MCG, such as a carrier in licensed band. At reception of a PDCP SDU, the transmitting PDCP entity can set up two discard timers associated with the received PDCP SDU. One of the two discard timers (referred to as "discard timer_1") can correspond to a PDCP SDU for MCG and the other discard timer (referred to as "discard timer_2") can correspond to the duplicated PDCP SDU for SCG. The two discard timers can be set up by initial values for each discard timer. The initial value of the discard timer_1 corresponding to MSG can be set to value 1, and the initial value of the discard timer_2 corresponding to SCG can be set to value 2 or an offset to value 1. The PDCP entity can first send the original PDCP PDU to RLC entity 2 in SCG which can be in an unlicensed band. When the PDCP PDU is sent to the RLC entity 2, the PDCP entity can start the discard timer_2. In this embodiment, when the RLC entity 2 sends a feedback failure report to the PDCP entity, the PDCP entity starts the discard timer_1 and sends the duplicated PDCP PDU to RLC entity 1. The feedback failure report can be triggered by excessive channel access delay, bad channel condition or other conditions.

Embodiment 6

In some embodiments where a split bearer is configured, two RLC entities can be associated with one PDCP entity of a communication device. The PDCP entity receives PDCP SDUs from upper layers and generates PDCP PDUs by adding PDCP header to the PDCP SDU. At the reception of a PDCP SDU, the PDCP entity starts a first discard timer for it. The PDCP entity of the PDCP protocol layer routes PDCP PDUs to one of two RLC entities associated with the communication device of the PDCP entity. When an RLC entity receives the PDCP PDUs, the RLC entity starts an RLC timer. Under certain conditions, the PDCP entity start routing a PDCP PDU to the second RLC entity. The conditions can be at least one of the followings:

Buffer status of PDCP entity,
Buffer status of first or second RLC entity,

One or more buffer status of Medium Access Control
(MAC) entity,
Channel occupancy rate,
Received signal strength indication (RSSI),
LBT status,
Channel access delay, or
Expiration of the first RLC timer.

Once one or more of above conditions become(s) true, the PDCP entity may stop routing PDCP PDUs to the first RLC entity and start routing PDCP PDUs to the second RLC entity, or the PDCP entity may start routing PDCP PDUs to both the first and second RLC entity, or if PDCP duplication is activated, then the PDCP entity may start duplicating a PDCP PDU and routing each copy of the PDCP PDU to both the first and second RLC entity.

As an extension of Embodiment 6 but without being limited by Embodiment 6, when the PDCP entity start routing PDCP PDUs to the second RLC entity, the PDCP entity may start a second discard timer for a PDCP SDU with an initial value that can be the same or different from the initial value of the first discard timer of the PDU which is routed to the first RLC entity. If duplication is activated, the PDCP entity may start two discard timers for a PDCP SDU with different initial values.

Embodiment 7

In some embodiments, such as is described in Embodiment 6, the PDCP entity can be located in MCG in licensed band. For embodiments related to Embodiment 7, the first RLC can be located in the MCG, and the second RLC can be located in a SCG in an unlicensed band or licensed band. As described in Embodiment 6, the PDCP entity may route the PDCP PDUs to the RLC entity located in the SCG in the unlicensed band when at least one of the following conditions becomes true:
 PDCP buffered data is over a threshold (e.g., a buffer status of PDCP entity indicates an over threshold condition);
 Buffered data in RLC entity located in MCG is over a threshold (e.g., a buffer status of the first RLC entity associated with MCG indicates an over threshold condition);
 Buffered data in RLC entity located in SCG is below a threshold (e.g., a buffer status of the second RLC entity associated with SCG indicates a below threshold condition);
 Buffered data in MAC entity located in MCG is over a threshold (e.g., a buffer status of the MAC entity associated with MCG indicates an over threshold condition);
 Buffered data in MAC entity located in SCG is below a threshold (e.g., a buffer status of the MAC entity associated with SCG indicates a below threshold condition);
 Channel occupancy rate measured in SCG is below a threshold;
 RSSI measured in SCG is below a threshold;
 LBT failure rate measured in SCG is below a threshold (e.g., the LBT status indicating a failure rate measured in SCG indicates a below threshold condition); or
 Average channel access delay measured in SCG is below a threshold.

In Embodiment 7, the SCG can also be in licensed band.

Embodiment 8

In some embodiments, such as is described in Embodiment 6, the PDCP entity can be located in SCG in unlicensed band or licensed band. For embodiments related to Embodiment 8, the first RLC can be located in the SCG, and the second RLC can be located in a MCG in a licensed band. As described in Embodiment 6, the PDCP entity may route the PDCP PDUs to the RLC entity located in the MCG in the licensed band when at least one of the following conditions becomes true:
 PDCP buffer data is over a threshold;
 Buffered data in RLC entity located in SCG is over a threshold;
 Buffered data in RLC entity located in MCG is below a threshold;
 Buffered data in MAC entity located in SCG is over a threshold;
 Buffered data in MAC entity located in MCG is below a threshold;
 Channel occupancy rate measured in SCG is over a threshold;
 RSSI measured in SCG is over a threshold;
 LBT failure rate measured in SCG is over a threshold; or
 Average channel access delay measured in SCG is over a threshold.

Embodiment 9

In some embodiments, the PDCP entity can be located in SCG in unlicensed band. As described in Embodiment 6, the PDCP entity may reroute the PDCP PDUs to the RLC entity located in MCG in licensed band when a RLC timer expires. The RLC entity may discard a RLC SDU which is a PDCP PDU received from the PDCP entity when the RLC timer corresponding the RLC SDU expires if the RLC entity has not sent the RLC SDU or any segment of the RLC SDU to lower layer. The RLC entity indicates the discard of RLC SDUs to the PDCP entity. The PDCP entity may reroute the PDCP PDU corresponding to the discarded RLC SDU to the RLC entity located in MCG in licensed band. The PDCP entity may initiate or reset the discard timers for the PDCP SDUs to the discarded RLC SDUs to a new value. When the RLC entity indicates that the RLC SDUs (an RLC SDU is same as a PDCP PDU) are discarded, the first discard timer associated with the PDCP PDU that had an initial value can be reset to a different initial value. Thus, the PDCP entity in MCG can regenerate a PDCP PPDU from the buffered PDCP SDU, and the discarded RLC SDU may not be sent to the MCG.

As in Embodiment 9, if PDCP duplication is activated, then RLC entity may not discard the RLC SDU when the RLC timer corresponding the RLC SDU expires if the RLC entity has not sent the RLC SDU or any segment of the RLC SDU to lower layer. The RLC entity indicates the expired RLC SDUs to the PDCP entity. The PDCP entity may start routing the expired RLC SDUs to the RLC entity located in MCG in licensed band. The PDCP entity may start a new discard timer, for example, a second discard timer, for each of the corresponding PDCP SDUs of the expired RLC SDUs. The original discard timer for the PDCP SDUs may not be updated. When both the original discard timer and new timer associated with the PDCP SDU expire, the PDCP entity discards the PDCP SDU. When any of the two discard timers associated with the PDCP SDU expires, only the RLC SDU in the corresponding RLC entity will be discarded if the RLC entity has not sent the RLC SDU or any segment of the RLC SDU to lower layer.

Embodiment 7, 8, and 9 can be used for transmission on downlink or uplink or both direction.

Embodiment 10

In some embodiments, Radio Resource Control layer (RRC) generate control messages and transport the RRC messages to PDCP layer. Signaling radio bearers (SRB) can be used for the transmission of different RRC messages. For example, SRB0, SRB1 and SRB2 can be used for different RRC messages mapping to different logical channels. Each SRB (except for SRB0) can be associated with one PDCP entity. At RRC layer, the PDUs corresponding to those SRBs can be duplicated and sent to its associated PDCP entity. At the reception of an RRC PDU, e.g., RRC messages carried on SRB1, the associated PDCP entity can start a discard timer and assign a PDCP sequence number for the RRC PDU. The duplicated RRC PDU can be assigned a different PDCP sequence number, and a separate discard timer can be started for it when the duplicated PDU is received.

At the receiver side, the peer PDCP entity can deliver all received PDCP SDUs corresponding to SRB1 including the duplicated RRC PDU to RRC layer. In some embodiments, the peer RRC layer at the receiver side can treat each received PDCP SDU as an independent valid RRC message and can respond to the RRC message carried in the PDCP SDU respectively. In some other embodiments, the peer RRC layer at the receiver side can treat received PDCP SDU and the duplicated one as one valid RRC and can only respond to one RRC message.

Figure 3:
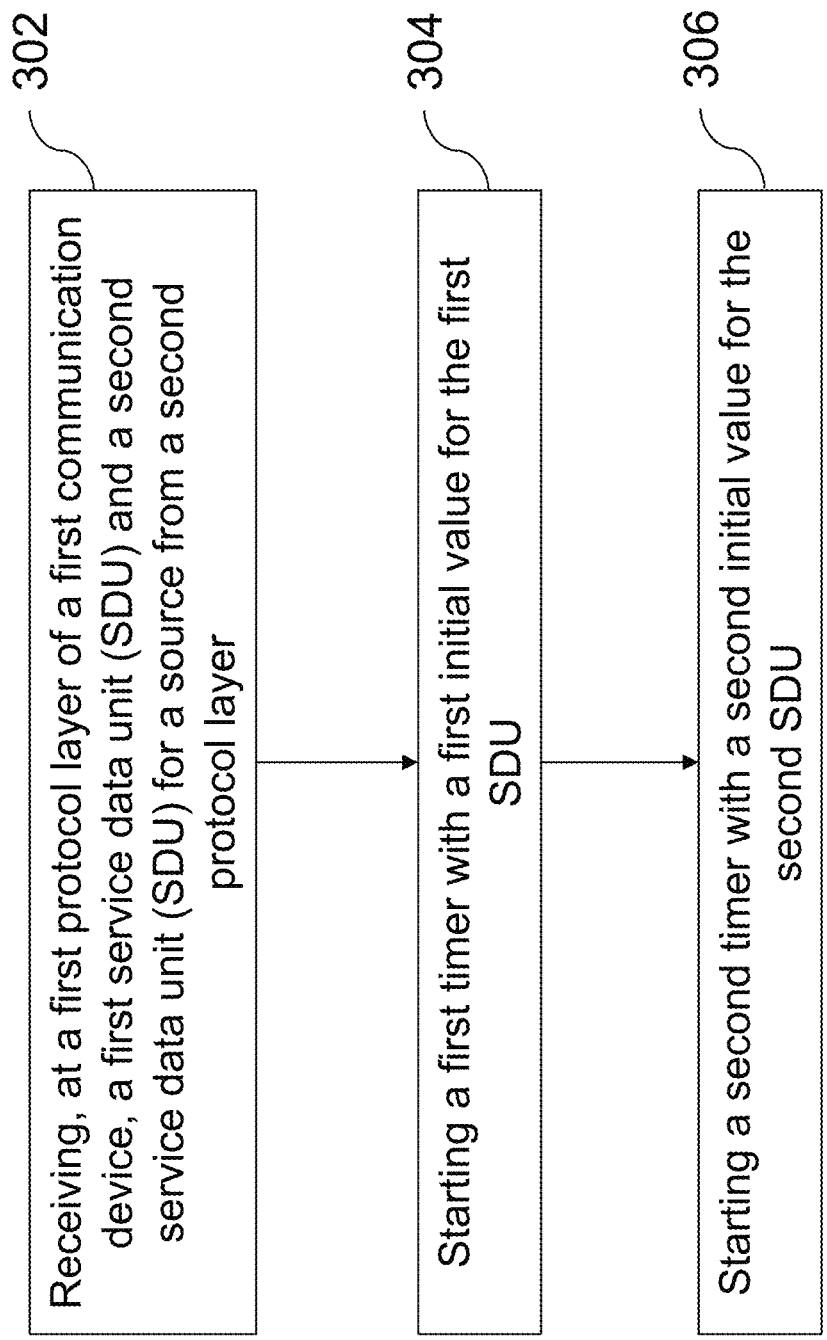
FIG. 3 shows a first example of a flowchart to operate timers for PDCP SDUs.

FIG. 3 shows a first example of a flowchart to operate timers for PDCP SDUs. At the receiving operation 302, a first protocol layer of a first communication device receives a first service data unit (SDU) and a second service data unit (SDU) for a source from a second protocol layer for transmission to a second communication device. In some embodiments, the first communication device can include a user equipment and the second communication device can include a base station. In some other embodiments, the first communication device can include a base station and the second communication device can include a user equipment. The first protocol layer can be a protocol data convergence layer and the second protocol layer can be an upper layer of the first protocol layer. The source can be a session at the first protocol layer or a radio bearer.

At the first starting operation 304, a first timer is started with a first initial value for the first SDU. At the second starting operation 306, a second timer is started with a second initial value for the second SDU. The second initial value is different from the first initial value in response to determining that the second SDU is to be routed differently from the first SDU to the second communication device. In some embodiments where the first SDU is routed to the second communication device via an unlicensed spectrum channel and the second SDU is routed to the second communication device via a licensed spectrum channel, the first initial value is greater than the second initial value. In some other embodiments where the second SDU is routed to the second communication device via an unlicensed spectrum channel and the first SDU is routed to the second communication device via a licensed spectrum channel, the second initial value is greater than the first initial value.

Additional features associated with the flowchart of FIG. 3 are further described at least in Embodiment 1.

Figure 4:
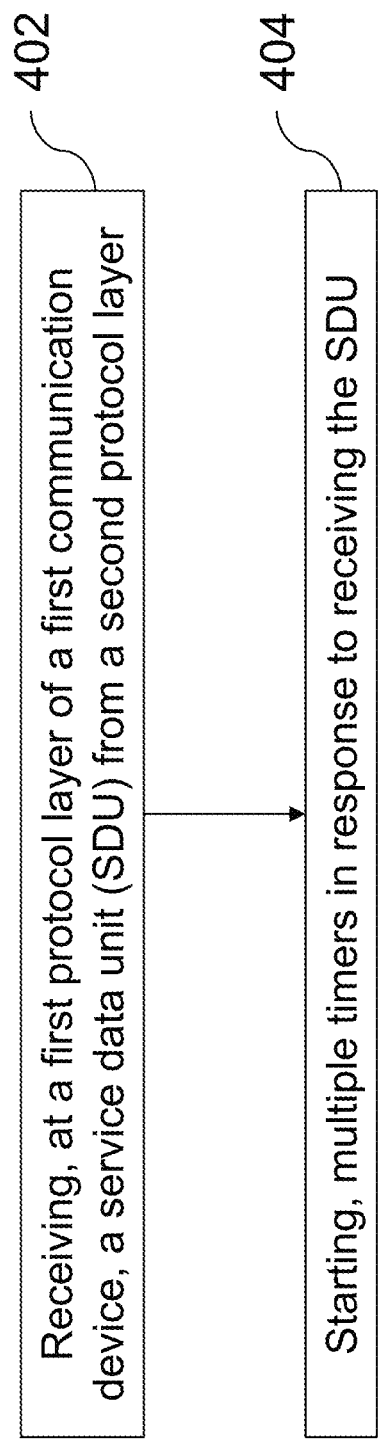
FIG. 4 shows a second example of a flowchart to operate timers for PDCP SDUs.

FIG. 4 shows a second example of a flowchart to operate timers for PDCP SDUs. At the receiving operation 402, a first protocol layer of a first communication device receives a service data unit (SDU) from a second protocol layer. The first protocol layer can be a protocol data convergence layer and the second protocol layer can be an upper layer of the first protocol layer.

At the starting operation 404, multiple timers are started in response to receiving the SDU where each of the multiple timers corresponds to a different path for routing a plurality of packet data units (PDU) generated from the SDU to a second communication device. In some embodiments, the first communication device can include a user equipment and the second communication device can include a base station. In some other embodiments, the first communication device can include a base station and the second communication device can include a user equipment. In some embodiments, the plurality of PDUs generated from the SDU include duplicate PDUs and the timers for the duplicate PDU are started at different times.

In some embodiments, a first PDU is routed to the second communication device via an unlicensed spectrum channel and a second PDU is routed to the second communication device via a licensed spectrum channel, and the second PDU is a duplicate of the first PDU. In such embodiments, a first initial value for a first timer of the first PDU is greater than a second initial value for the second timer of the second PDU.

In some other embodiments, a first PDU is routed to the second communication device via a licensed spectrum channel and a second PDU is routed to the second communication device via an unlicensed spectrum channel, and the second PDU is a duplicate of the first PDU. In such embodiments, a second initial value for a second timer of the second PDU is greater than a first initial value for the first timer of the first PDU.

In some embodiments, the flowchart shown in FIG. 4 can also include generating multiple PDUs from the SDU, and discarding a given PDU that remains untransmitted at expiration of corresponding timer while retaining the SDU for transmission.

In some embodiments, the flowchart shown in FIG. 4 can also include generating multiple PDUs from the SDU, receiving an indication of a successful delivery of the SDU, and discarding, after receiving the indication, the SDU. In such embodiments, the method can perform any one of (1) discarding, after receiving the indication, the multiple PDUs generated from the SDU, and (2) indicating to entities of a third protocol layer that the SDU has been discarded. The entities of the third protocol layer can include radio link control (RLC) entities. In some embodiments, the SDU can be discarded in response to expirations of the multiple timers.

Additional features associated with the flowchart of FIG. 4 are further described at least in Embodiments 2-4.

Figure 5:
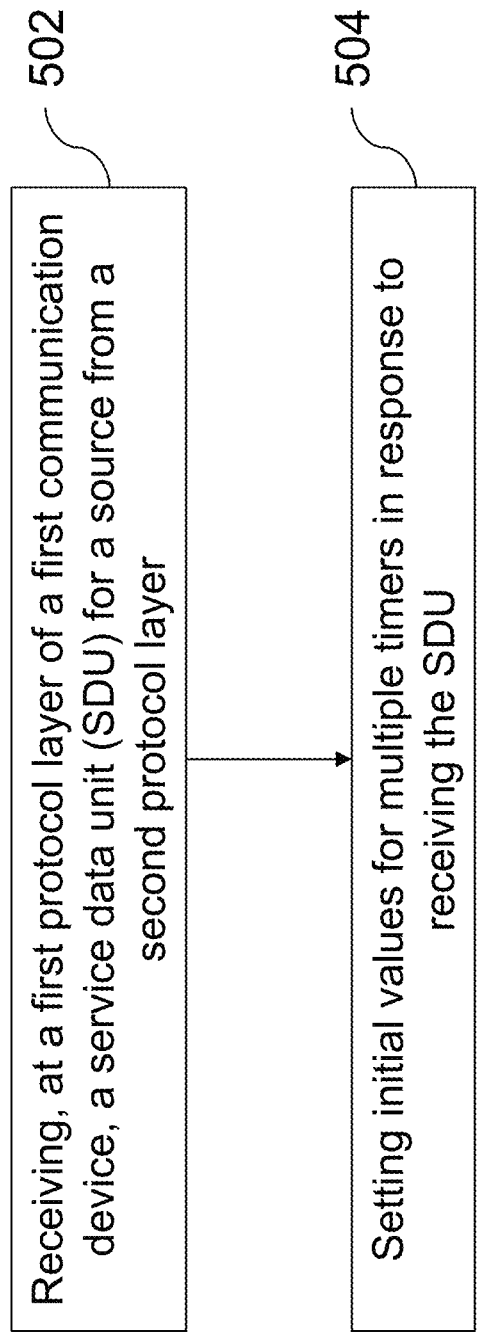
FIG. 5 shows a third example of a flowchart to operate timers for PDCP SDUs.

FIG. 5 shows a third example of a flowchart to operate timers for PDCP SDUs. At the receiving operation 502, a first protocol layer of a first communication device receives a service data unit (SDU) for a source from a second protocol layer. The first protocol layer can be a protocol data convergence layer and the second protocol layer can be an upper layer of the first protocol layer.

At the setting initial values operation 504, initial values for multiple timers are set in response to receiving the SDU, where each of the multiple timers corresponds to a different path for routing a plurality of packet data units (PDU) generated from the SDU to a second communication device. In some embodiments, the first communication device can include a user equipment and the second communication device can include a base station. In some other embodiments, the first communication device can include a base station and the second communication device can include a user equipment. The plurality of PDUs generated from the SDU can include duplicate PDUs and wherein the timers for the duplicate PDU are started at different times.

In some embodiments, the flowchart shown in FIG. 5 can also include starting, in response to receiving a feedback from a secondary cell group (SCG), a first timer for a first PDU routed to the second communication device via an unlicensed spectrum channel, and starting, in response to receiving a failure report feedback from the SCG, a second timer for a second PDU routed to the second communication device via a licensed spectrum channel, wherein the second PDU is a duplicate of the first PDU. In such embodiments, a first initial value for the first timer is greater than a second initial value for the second timer.

Additional features associated with the flowchart of FIG. 5 are further described at least in Embodiment 5.

Figure 6:
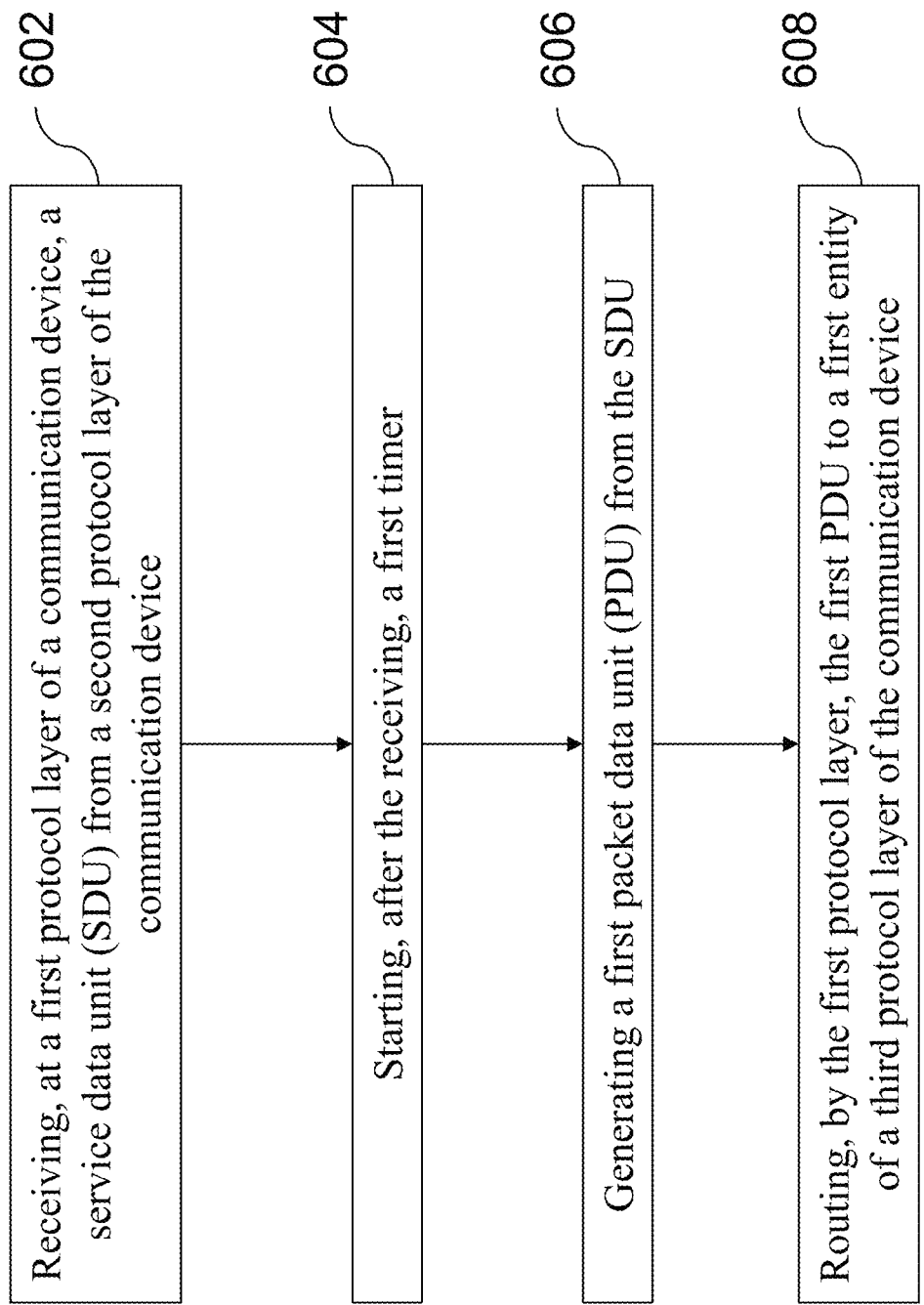
FIG. 6 shows a fourth example of a flowchart to operate timers for PDCP SDUs.

FIG. 6 shows a fourth example of a flowchart to operate timers for PDCP SDUs. At the receiving operation 602, a first protocol layer of a communication device receives a service data unit (SDU) from a second protocol layer of the communication device. The first protocol layer can be a protocol data convergence layer, and the second protocol layer can be an upper layer of the first protocol layer.

At the starting operation 604, the communication device starts a first timer after the receiving operation 602. At the generating operation 606, the first packet layer can generate a first packet data unit (PDU) from the SDU.

At the routing operation 608, the first PDU can be routed by the first protocol layer to a first entity of a third protocol layer of the communication device. The first entity of the third protocol layer can be a first radio link control (RLC) entity. In some embodiments, the communication device is a user equipment or a base station.

In some embodiments, the flowchart shown in FIG. 6 can also include routing, by the first protocol layer, a second PDU to a second entity of the third protocol layer in response to at least one of: a first buffer status of the first protocol layer, a status of a buffer associated with the first entity or the second entity of the third protocol layer, one or more buffer status of a fourth protocol layer, a channel occupancy rate, a received signal strength indication (RSSI), a listen before talk (LBT) status, a channel access delay, and an expiration of a timer associated with the PDU of the third protocol layer. In such embodiments, a second timer can be started in response to routing the second PDU to the second entity of the third protocol layer, and a first initial value of the first timer and a second initial value of the second timer can be the same or different. The second entity of the third protocol layer can be a second RLC entity, and the fourth protocol layer can be a medium access control (MAC) entity.

In some embodiments, the first protocol layer and the first entity of the third protocol layer are associated with a master cell group (MCG) that utilize a licensed spectrum channel for transmission, and the second entity of the third protocol layer is associated with a secondary cell group (SCG) that utilize an unlicensed spectrum channel or a licensed spectrum channel for transmission. In such embodiments, the routing of the second PDU to the second entity of the third protocol layer is in response to at least one of: the first buffer status of the first protocol layer indicating buffered data being over threshold, the status of the buffer associated with the first entity of the third protocol layer indicating buffered data being over threshold, the status of the buffer associated with the second entity of the third protocol layer indicating buffered data being below threshold, a second buffer status of the fourth protocol layer associated with the MCG indicating buffered data being over threshold, a third buffer status of the fourth protocol layer associated with the SCG indicating buffered data being below threshold, the channel occupancy rate measured in SCG being below threshold, the RSSI measured in SCG being below threshold, the LBT status indicating a failure rate measured in SCG being below threshold, and an average of the channel access delay measured in SCG is below threshold.

In some other embodiments, the first protocol layer and the first entity of the third protocol layer are associated with a secondary cell group (SCG) that utilize an unlicensed spectrum channel or a licensed spectrum channel for transmission, and the second entity of the third protocol layer is associated with a master cell group (MCG) that utilize a licensed spectrum channel for transmission. In such embodiments, the routing of the second PDU to the second entity of the third protocol layer is in response to at least one of: the first buffer status of the first protocol layer indicating buffered data being over threshold, the status of the buffer associated with the first entity of the third protocol layer indicating buffered data being over threshold, the status of the buffer associated with the second entity of the third protocol layer indicating buffered data being below threshold, a second buffer status of the fourth protocol layer associated with the SCG indicating buffered data being over threshold, a third buffer status of the fourth protocol layer associated with the MCG indicating buffered data being below threshold, the channel occupancy rate measured in SCG being over threshold, the RSSI measured in SCG being over threshold, the LBT status indicating a failure rate measured in SCG being over threshold, and an average of the channel access delay measured in SCG is over threshold.

In some embodiments, where the first protocol layer and the first entity of the third protocol layer are associated with a secondary cell group (SCG) that utilize an unlicensed spectrum channel or a licensed spectrum channel for transmission, and where the second entity of the third protocol layer is associated with a master cell group (MCG) that utilize a licensed spectrum channel for transmission, the method can further include discarding, by the first entity of the third protocol layer, the first PDU received from the first protocol layer in response to (1) the expiration of the timer associated with the PDU of the third protocol layer and (2) a determination that the first entity of the third protocol layer has not sent a first SDU related to the first PDU or any segment of the first SDU to a lower layer, indicating, by the first entity of the third protocol layer, the discarding of the first PDU to the first protocol layer, and routing, by the first protocol layer, the first PDU to the second entity of the third protocol layer. In some embodiments, a first initial value of the first timer can be set after the discarding of the first PDU.

In some embodiments, where the first protocol layer and the first entity of the third protocol layer are associated with a secondary cell group (SCG) that utilize an unlicensed spectrum channel or a licensed spectrum channel for transmission, and where the second entity of the third protocol layer is associated with a master cell group (MCG) that utilize a licensed spectrum channel for transmission, the method can further include indicating, by the first entity of the third protocol layer, the expiration of the timer associated with the PDU of the third protocol layer, routing, by the first protocol layer, the first PDU to the second entity of the third protocol layer, and starting, after the routing of the first PDU to the second entity of the third protocol layer, a second timer.

Additional features associated with the flowchart of FIG. 6 are further described at least in Embodiments 6-9.

Figure 7:
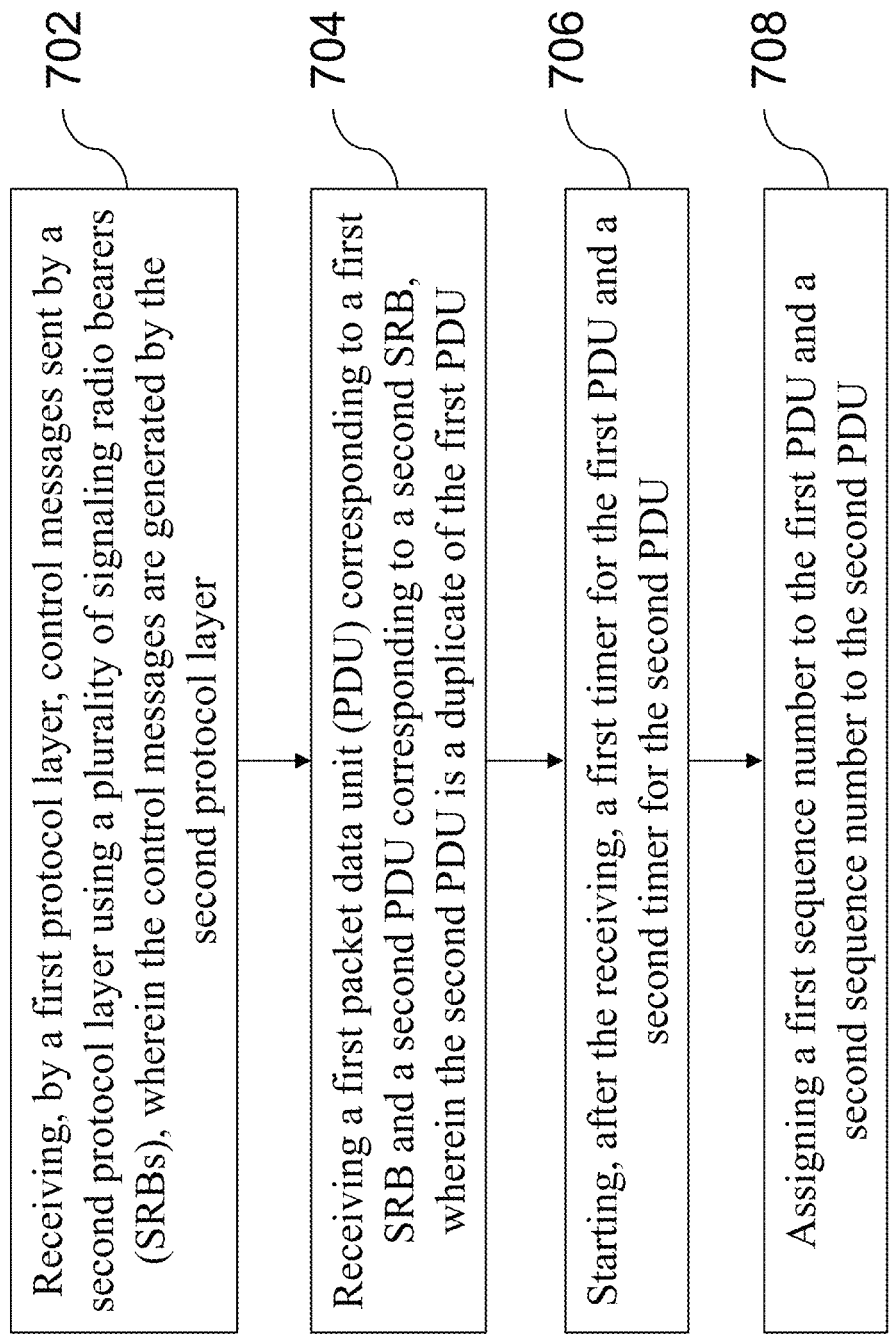
FIG. 7 shows a fifth example of a flowchart to operate timers for PDCP SDUs.

FIG. 7 shows a fifth example of a flowchart to operate timers for PDCP SDUs. At the first receiving operation 702, a first protocol layer receives control messages sent by a second protocol layer using a plurality of signaling radio bearers (SRBs), wherein the control messages are generated by the second protocol layer. The first protocol layer can be a packet data convergence protocol (PDCP) layer, and the second protocol layer can be a radio resource control (RRC) layer.

At the second receiving operation 704, a first packet data unit (PDU) corresponding to a first SRB and a second PDU corresponding to a second SRB are received. The second PDU may be a duplicate of the first PDU.

At the starting operation 706, after the receiving operation, a first timer for the first PDU and a second timer for the second PDU are started. At the assigning operation 708, a first sequence number is assigned to the first PDU and a second sequence number is assigned to the second PDU.

Additional features associated with the flowchart of FIG. 7 are further described at least in Embodiment 10.

Figure 8:
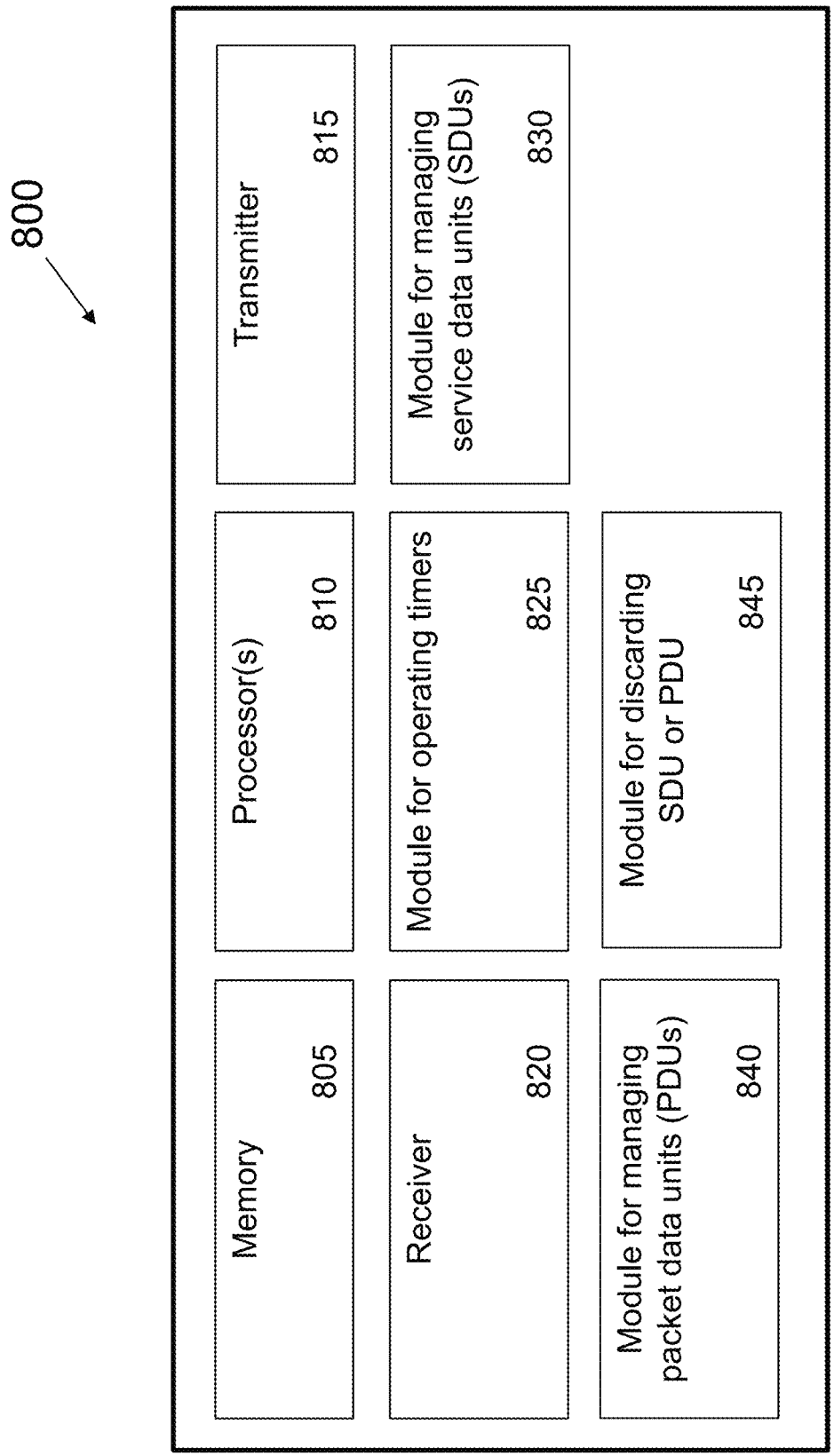
FIG. 8 shows a block diagram for operating a protocol layer.

FIG. 8 shows a block diagram for operating a protocol layer of a communication device. The communication device can include a user equipment or a base station as described in this patent document. The communication device 800 includes at least one processor 810 and a memory 805 having instructions stored thereupon. The instructions upon execution by the processor 810 configure the communication device 800 to perform the operations described for FIGS. 3 to 7 and in the embodiments described in this patent document. The transmitter 815 transmits or sends information or data to another communication device. The receiver 820 receives information or data transmitted or sent by another communication device.

The module for operating timers 825 can operate one or more timers as described for FIGS. 3 to 7 and in the embodiments described in this patent document. The module for managing service data units (SDUs) 830 can process and route the one or more SDUs received from another layer above the layer that received the SDUs. The module for managing packet data units (PDUs) 835 can generate the PDUs from the SDUs as described in this patent document to be routed to a destination. The module for managing SDUs 830 and the module for managing PDUs 835 can perform operations related to one or more SDUs and one or more PDUs, respectively, as described for FIGS. 3 to 7 and in the embodiments described in this patent document.

The module for discarding SDU or PDU 845 can discard one or more SDU or one or more PDU as described for FIGS. 4 and 6, and in the embodiments described in this patent document.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
   receiving, at a first protocol layer of a first communication device, a service data unit (SDU) from a second protocol layer;
   starting multiple timers at different times and in response to receiving the SDU, wherein the multiple timers corresponds to different paths for routing a plurality of packet data units (PDU) generated from the SDU to a second communication device, wherein the plurality of PDUs generated from the SDU include duplicate PDUs,
wherein the first communication device is a base station and the second communication device is a user equipment;
discarding a given PDU that remains untransmitted at expiration of corresponding timer while retaining the SDU for transmission;
receiving an indication of a successful delivery of the SDU;
discarding, after receiving the indication, the SDU; and
performing any one of:
  discarding, after receiving the indication, the multiple PDUs generated from the SDU; and
  indicating to entities of a third protocol layer that the SDU has been discarded,
wherein the first protocol layer is a packet data convergence protocol (PDCP) layer, the second protocol layer is an upper layer of the first protocol layer, and the entities of the third protocol layer are radio link control (RLC) entities.

2. The method of claim 1, wherein
a first PDU is routed to the second communication device via an unlicensed spectrum channel and a second PDU is routed to the second communication device via a licensed spectrum channel, and
the second PDU is a duplicate of the first PDU.

3. The method of claim 1, wherein
a first PDU is routed to the second communication device via a licensed spectrum channel and a second PDU is routed to the second communication device via an unlicensed spectrum channel, and
the second PDU is a duplicate of the first PDU.

4. The method of claim 1,
wherein the plurality of PDUs include a first PDU and a second PDU,
wherein the second PDU is a duplicate of the first PDU,
wherein the discarding includes the PDCP layer of the base station indicating a discard indication to discard the first PDU to an radio link control (RLC) entity of the base station in response to an expiration of a timer associated with the first PDU and in response to the PDCP layer having sent the first PDU to the RLC entity.

5. The method of claim 4, wherein the discard indication related to the first PDU is not sent to a second RLC entity in another base station where the second PDU is sent.

6. The method of claim 1, further comprising:
discarding the SDU at expiration of the multiple timers.

7. A first communication device, comprising:
at least one processor and a memory that has instructions stored thereupon, the instructions upon execution by the at least one processor configure the first communication device to:
receive, at a first protocol layer, a service data unit (SDU) from a second protocol layer;
start multiple timers at different times and in response to receiving the SDU, wherein the multiple timers corresponds to different paths for routing a plurality of packet data units (PDU) generated from the SDU to a second communication device,
  wherein the plurality of PDUs generated from the SDU include duplicate PDUs,
  wherein the first communication device is a base station and the second communication device is a user equipment;
discard a given PDU that remains untransmitted at expiration of corresponding timer while the SDU is retained for transmission;
receive an indication of a successful delivery of the SDU;
discard, after receiving the indication, the SDU; and
perform any one of:
  discard, after receiving the indication, the multiple PDUs generated from the SDU; and
  indicate to entities of a third protocol layer that the SDU has been discarded,
wherein the first protocol layer is a packet data convergence protocol (PDCP) layer, the second protocol layer is an upper layer of the first protocol layer, and the entities of the third protocol layer are radio link control (RLC) entities.

8. The first communication device of claim 7, wherein
a first PDU is routed to the second communication device via an unlicensed spectrum channel and a second PDU is routed to the second communication device via a licensed spectrum channel, and
the second PDU is a duplicate of the first PDU.

9. The first communication device of claim 7, wherein
a first PDU is routed to the second communication device via a licensed spectrum channel and a second PDU is routed to the second communication device via an unlicensed spectrum channel, and
the second PDU is a duplicate of the first PDU.

10. The first communication device of claim 7,
wherein the plurality of PDUs include a first PDU and a second PDU,
wherein the second PDU is a duplicate of the first PDU,
wherein the discard includes the PDCP layer of the base station that indicates a discard indication to discard the first PDU to an radio link control (RLC) entity of the base station in response to an expiration of a timer associated with the first PDU and in response to the PDCP layer having sent the first PDU to the RLC entity.

11. The first communication device of claim 10, wherein the discard indication related to the first PDU is not sent to a second RLC entity in another base station where the second PDU is sent.

12. The first communication device of claim 7, wherein the at least one processor is further configured to:
discard the SDU at expiration of the multiple timers.

13. A non-transitory computer readable program storage medium having code stored thereon, the code, when executed by a processor, causing the processor to implement a method, comprising:
receiving, at a first protocol layer of a first communication device, a service data unit (SDU) from a second protocol layer;
starting multiple timers at different times and in response to receiving the SDU, wherein the multiple timers corresponds to different paths for routing a plurality of packet data units (PDU) generated from the SDU to a second communication device,
  wherein the plurality of PDUs generated from the SDU include duplicate PDUs,
  wherein the first communication device is a base station and the second communication device is a user equipment;
discarding a given PDU that remains untransmitted at expiration of corresponding timer while retaining the SDU for transmissions;
receiving an indication of a successful delivery of the SDU;
discarding, after receiving the indication, the SDU; and performing any one of:
- discarding, after receiving the indication, the multiple PDUs generated from the SDU; and
- indicating to entities of a third protocol layer that the SDU has been discarded, wherein the first protocol layer is a packet data convergence protocol (PDCP) layer, the second protocol layer is an upper layer of the first protocol layer, and the entities of the third protocol layer are radio link control (RLC) entities.

14. The non-transitory computer readable program storage medium of claim 13, wherein
    a first PDU is routed to the second communication device via an unlicensed spectrum channel and a second PDU is routed to the second communication device via a licensed spectrum channel, and
    the second PDU is a duplicate of the first PDU.

15. The non-transitory computer readable program storage medium of claim 13, wherein
    a first PDU is routed to the second communication device via a licensed spectrum channel and a second PDU is routed to the second communication device via an unlicensed spectrum channel, and
    the second PDU is a duplicate of the first PDU.

16. The non-transitory computer readable program storage medium of claim 13,
    wherein the plurality of PDUs include a first PDU and a second PDU,
    wherein the second PDU is a duplicate of the first PDU,
    wherein the discarding includes the PDCP layer of the base station indicating a discard indication to discard the first PDU to an radio link control (RLC) entity of the base station in response to an expiration of a timer associated with the first PDU and in response to the PDCP layer having sent the first PDU to the RLC entity.

17. The non-transitory computer readable program storage medium of claim 16, wherein the discard indication related to the first PDU is not sent to a second RLC entity in another base station where the second PDU is sent.

18. The non-transitory computer readable program storage medium of claim 13, wherein the method further comprises:
    discarding the SDU at expiration of the multiple timers.

* * * * *